United States Patent [19]

Barrow et al.

[11] Patent Number: 4,797,332

[45] Date of Patent: Jan. 10, 1989

[54] METHOD OF PREPARING CERAMIC SURFACES FOR WETTING THEREOF BY ALKALI METALS

[75] Inventors: Peter Barrow, Alvaston; Michael L. Wright, Allestree, both of England

[73] Assignee: Lilliwyte Societe Anonyme, Luxembourg

[21] Appl. No.: 97,521

[22] Filed: Sep. 16, 1987

[30] Foreign Application Priority Data

Sep. 25, 1986 [GB] United Kingdom ............... 8623071

[51] Int. Cl.$^4$ ........................................... H01M 10/39
[52] U.S. Cl. .................................. 429/104; 429/193
[58] Field of Search ............................ 429/193, 104

[56] References Cited

U.S. PATENT DOCUMENTS

| | | | |
|---|---|---|---|
| 3,982,959 | 9/1976 | Partridge et al. | 429/104 |
| 4,021,255 | 5/1977 | Chiku et al. | 429/193 |
| 4,076,903 | 2/1978 | Sudworth et al. | 429/104 |
| 4,348,468 | 9/1982 | Wright | 429/193 |
| 4,356,241 | 10/1982 | Wright et al. | 429/104 |
| 4,396,688 | 8/1983 | Stackpool | 429/104 |
| 4,407,912 | 10/1983 | Virkar et al. | 429/104 |

FOREIGN PATENT DOCUMENTS 0044638 1/1981 European Pat. Off. .
0032033 1/1984 European Pat. Off. .

Primary Examiner—Donald L. Walton
Attorney, Agent, or Firm—Arnold, White & Durkee

[57] ABSTRACT

The invention provides a method of preparing a surface of a ceramic solid electrolyte conductor of alkali metal ions for wetting by said alkali metal in molten form. The method comprises doping the ceramic surface with an oxide of a transition metal. Transition metals such as Fe, Ni, Cu, Mn, Co, Cr or Mo have suitable oxides for doping beta-alumina for wetting by sodium.

12 Claims, 1 Drawing Sheet

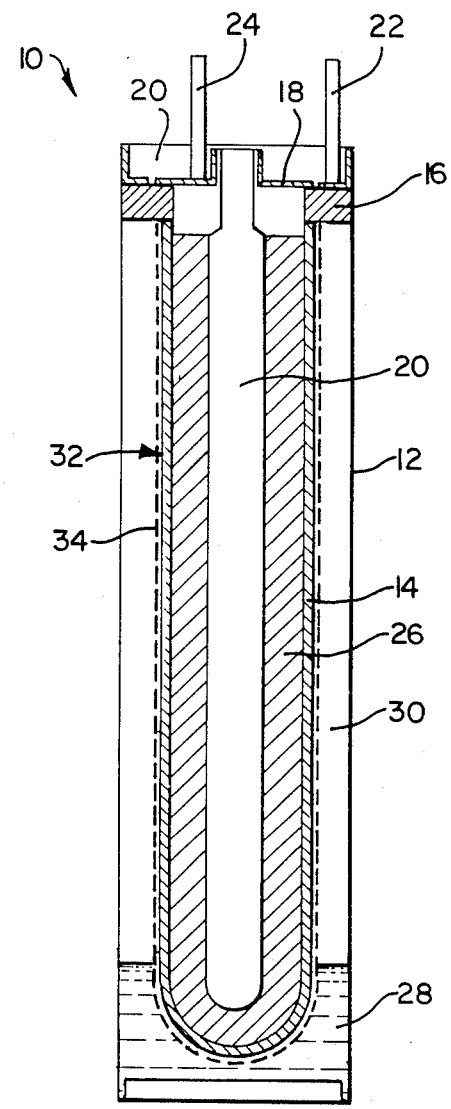

METHOD OF PREPARING CERAMIC SURFACES FOR WETTING THEREOF BY ALKALI METALS

This invention relates to a method of preparing a surface of a ceramic solid electrolyte conductor of alkali metal ions for wetting, in molten form, by the alkali metal whose ions are conducted by the ceramic. More particularly it relates to a method suitable for preparing a surface of a ceramic beta-alumina solid electrolyte conductor of sodium ions for wetting, in molten form, by sodium in a high temperature electrochemical power storage cell. The invention also relates to a high temperature electrochemical power storage cell having a molten alkali metal anode, a cathode, and between the anode and the cathode and separating them from each other, a separator which is a ceramic solid electrolyte conductor of ions of the alkali metal of the anode.

According to the invention there is provided a method of preparing a surface of a ceramic solid electrolyte conductor of alkali metal ions for wetting, in molten form, by the alkali metal whose ions are conducted by the ceramic, which method comprises doping the ceramic surface with an oxide of a transition metal.

While the method may comprise doping the ceramic surface with an oxide of any transition metal, or indeed with a mixture of oxides of any one or more transition metals, for convenience the method will typically comprise doping the ceramic surface with an oxide of a single transition metal.

It is contemplated that the invention will find its main application in the doping of ceramic solid electrolyte conductors of alkali metal ions for use in high temperature electrochemical cells in which, as described hereunder, there is a molten alkali metal anode of the metal whose ions are conducted by the ceramic, separated by a separator comprising the ceramic from a cathode, it being desirable to have the surface of the ceramic in contact with the anode fully wetted by the alkali metal of the anode as soon as possible after raising of the electrochemical cell to its operating temperature, and at all times during operation of the cell thereafter.

In this context it is accordingly desirable to employ an oxide of the transition metal for the doping which will be electrochemically inert in the intended cell anode environment, and which is readily available at an acceptable price.

For these reasons, bearing in mind that cells of the type in question frequently have molten sodium anodes and a solid electrolyte which is beta-alumina or nasicon, the method may be applied to a solid electrolyte which is a member of the group comprising beta-alumina and nasicon ceramic solid conductors of sodium ions, the doping being by means of an oxide of a single transition metal selected from the group comprising iron, nickel, copper, manganese, cobalt, chromium and molybdenum.

The applicant has found that oxides of iron, nickel, copper manganese and chromium are electrochemically inert in the cell anode environments of such cells, and are readily available at acceptable prices.

The applicant is uncertain as to the exact mechanism or mechanisms whereby the transition metal oxide becomes doped on the ceramic surface to provide the enhanced wetting of said surface by the molten alkali metal in accordance with the present invention. According to one view, and without being bound by theory, it is believed that transition oxide molecules, clusters of molecules or crystallites thereof, for example of ferric oxide or nickel oxide, may become sorbed, i.e. absorbed and/or adsorbed, at active sites mutually spaced from one another on the ceramic surface. The doping of the ceramic surface with the transition metal oxide need thus accordingly not necessarily provide a continuous surface layer or coating on said surface of the oxide, for utility. It is believed that when excessive doping of the oxide takes place, eg to provide such continuous layer or coating, the oxide will only adhere more or less permanently at said active sites, the remainder of the oxide layer or coating, in excess of that sorbed at the available active sorption sites on the ceramic surface, being in the form of a dry loose powder, with no reliable functional properties for eventual wetting of the ceramic surface. Such excess oxide is not necessarily harmful, however, and is regarded as worst as dead weight, as it does not in any way adversely affect said wetting or the electrochemical operation of the cell.

Instead, in certain cases, depending on the transition metal selected, the transition metal oxide may become integrated or incorporated with and form part of the ceramic crystal structure or lattice, at active sites mutually spaced from one another on the ceramic surface. It may become incorporated as the transition metal oxide per se, or it may be present in the form of a mixed oxide, mixed e.g. with the oxide of the alkali metal whose ions are conducted by the ceramic.

Whatever the mechanism, however, enhanced wetting has been found to occur.

When the transition metal oxide is doped by sorption at active sites on the ceramic surface, e.g. as is believed to be the case for ferric oxide, nickel oxide or cupric oxide on beta-alumina, the transition metal oxide is capable of being reduced by the molten alkali metal with which it is intended to wet the ceramic surface. The transition metal oxide is thus in use in an electrochemical cell of the type mentioned above, reduced to the transition metal itself, e.g. iron, nickel or copper on a beta-alumina ceramic surface, where it remains sorbed in the form of atoms, atomic clusters or crystallites of transition metal. The Applicant has however found that, even after such reduction, the wettability of the ceramic surface by the alkali metal in question remains substantially enhanced, as it appears that both the transition metal oxide and the transition metal after reduction by the alkali metal, are substantially more easily wettable than the undoped ceramic surface.

Where the transition metal oxide becomes integrated with the crystal surface, as is believed possibly to be the case with e.g. manganese oxide or chromium oxide mentioned above, whether by itself or in the form of a mixed oxide with the alkali metal oxide, the Applicant has found that the transition metal oxide is not reduced by contact with the alkali metal, and instead remains, more or less indefinitely, in the form of an oxide on the ceramic surface, to provide enhanced wettability.

The applicant has found that a convenient method of doping the ceramic surface with the transition metal oxide in question comprises wetting the surface with a film of a solution in a liquid solvent of a salt of the transition metal, evaporating the solvent from the surface to dry the surface and to leave a deposit of the salt on the surface, and converting the deposited and salt to the oxide of the transition metal.

It is accordingly a criterion for selection of the salt of the transition metal in question that it should be readily or at least sufficiently soluble in a suitable liquid solvent to provide a solution of a sufficient concentration of the transition metal salt, which after drying, leaves sufficient deposited salt on the ceramic surface to cause doping of a sufficient number of active sites on the surface to provide adequately enhanced wetting. Preferrably the salt is sufficiently soluble to provide a solution of a high enough concentration to dope substantially all said active sites, i.e. all the potential sorption sites.

Water may usually be employed as the solvent, but in certain cases the Applicant has encountered difficulties in drying the ceramic surface and/or converting the deposited salt to the oxide, when water is used. It is nevertheless preferred to employ a polar solvent, e.g. one having a hydroxyl group, to promote solubility therein of the transition metal salt, and such solvent should also preferably easily wet the ceramic surface by virtue of its low viscosity and/or high surface tension. In this regard the Applicant has found that, when said difficulties are encountered with the preferred water solvent, short-chain monohydric alcohols are suitable, as they easily wet ceramic surfaces, while certain commonly encountered suitable salts of transition metal oxides are adequately soluble therein, such alcohols furthermore evaporating easily from the wetted surface during drying, to leave no residue which interferes with conversion of the deposited salt of the transition metal to the oxide. Furthermore, such alcohols have high volatility which assists in easy and rapid evaporation thereof from the ceramic surface, and their low viscosity leads to rapid and easy drainage thereof from a ceramic surface wetted thereby, to leave a continuous, uniform, thin layer of solution in film form on the surface, which is desireable.

Accordingly, the solvent may be selected from the group comprising water, methanol, ethanol and n-propanol. When such short-chain alcohols are used, they may be used in the form of mixtures, but should be anhydrous.

Water, while usually the preferred solvent, has in certain cases been found to be an inferior solvent compared with short chain alcohols such as ethanol, as the water can drain so rapidly from ceramic surfaces as to leave unwetted patches in respect of which there may be insufficient contact time between the solution and the surface for the transition metal salt to become sufficiently sorbed thereon. It is for this reason that anhydrous alcohols are sometimes employed.

Such solvents are readily available at acceptable cost, and use thereof in turn can influence the selection of the transition metal salt employed, ie transition metal salts are conveniently used which are soluble in water or such short chain alcohols and which are strongly sorbed at active sites on the ceramic surface. Usually, however, said alcohols are only used if water is found to be unsuitable.

Wetting the ceramic surface with a the solution may be by immersion, or may be by painting or spraying, and, as indicated above, evaporating the solvent may be in air and may be by heating to a suitable elevated temperature. The Applicant has dried alcohol-based halide solutions at 30°-50° C., and has dried aqueous nitrate solutions at 150° C.

While, in principle and as indicated above, any transition metal salt can be used for the method of the present invention, it is preferred to use salts which, upon conversion to the oxide of the transition metal, do not provide any products such as gases which can poison the ceramic surface from an electrochemical point of view. Inorganic salts such as the halides, e.g. chlorides, or the nitrates, have been found to be suitable from this point of view. Furthermore, nitrate salts are typically highly acidic and oxidizing, they readily coat beta-alumina tubes even after exposure of such tubes to the ambient air, and they are readily available available, have high solubility in water and decompose easily to oxides.

Converting of the deposited salt to the oxide may comprise heating the dried ceramic to an elevated temperature. Thus, if the salt is a halide, the heating may take place in an oxygen-containing oxidizing atmosphere such as air, whereby heating to a sufficient temperature for a sufficient time will convert the halide to the oxide. Furthermore, when transition metal halides are heated in air, and this air contains sufficient moisture, conversion to the oxide may take place at relatively low temperatures such as 150°-250° C., e.g. 200° C., over a period of 15-45 minutes, e.g. 30 minutes, by hydrolysis of the halide to the gaseous acid thereof and the hydroxide of the transition metal, which hydroxide then converts to the oxide. In dry air, heating to a different temperature for a different period may be necessary. Similarly, the Applicant has found that in the case of nitrates, heating to similar temperatures, e.g. 200° C., in an oxidizing atmosphere such as air will decompose them to the oxides.

However, if the salt is one, such as a nitrate, which automatically decomposes to the oxide upon heating, heating need not be in an oxygen-containing oxidizing atmosphere although, for convenience, an oxidizing atmosphere such as air may be employed.

For preparing beta-alumina for wetting by sodium, the Applicant has successfully employed ferric chloride, nickel chloride and manganese nitrate. The salts may accordingly be a compound of the transition metal with an anion selected from the group comprising halide and nitrate anions.

While, as indicated above, it is desirable to have the transition metal salt dissolved in the solvent at a concentration such that there are sufficient metal ions in the dissolved salt to occupy all the potential sorption sites on the ceramic surface, the concentration should not be so high that the solution tends to take up water from the atmosphere. In the case of ferric chloride, this can take place when solution concentrations are higher than 20% by mass, concentrations of 10-20% by mass of ferric chloride thus being preferred.

In the case of transition metals such as iron, nickel or copper whose sorbed oxides are reduced to the metals on contact with molten alkali metal, the doped oxide may naturally, if desired, be reduced, e.g. in a furnace in a hydrogen atmosphere to the metal, but as contact with the alkali metal in a high temperature electrochemical cell environment will in any event immediately reduce such oxides, separate reduction is not normally necessary.

In the case particularly of transition metals such as manganese or chromium, whose oxides become integrated with the crystal structure of the ceramic, doping the ceramic surface may instead comprise wetting the surface with a film of a suspension in a liquid of the transition metal oxide, evaporating the liquid of the suspension to dry the surface and leave a deposit of the oxide on the surface, and heating the dried surface to cause the oxide to dope the surface. In this case the transition metal oxide may form part of a mixed oxide, being mixed with an oxide of the alkali metal whose ions are conducted by the ceramic.

For such suspensions water is preferred as the liquid.

The invention extends also to a high temperature electrochemical power storage cell having a molten alkali metal anode, a cathode, and between the anode and the cathode and separating them from each other, a separator which is a ceramic solid electrolyte conductor of ions of the alkali metal of the anode, the separator having a surface in contact with the molten alkali metal of the anode which has been prepared for wetting by the alkali metal of the anode, by the method described above.

The invention will now be described, by way of non-limiting illustrative example, with reference to the following Examples, and with reference to the accompanying diagrammatic drawing which shows a schematic sectional side elevation of a cell according to the invention.

In the drawing a cell in accordance with the invention is generally designated by reference numeral 10. The cell 10 comprises an outer tubular steel cell housing 12, within which is concentrically located a beta-alumina tube 14 which is closed at one end and open at the other. In the drawing the cell is shown in an upright condition, with the closed end of the tube 14 lowermost, and its open end uppermost. Said open end is sealed by glass to an alpha-alumina ring 16 to which the housing 12 is also sealed by glass, to provide a sealed anode compartment between the tube 14 and housing 12.

The upper end of the tube 14 is closed off by an annular steel closure member 18, into the central opening of which is sealed a steel current collector 20 in the form of a bar or rod which extends downwardly concentrically into the tube 14, to a position closely spaced from its closed end.

The housing 12 extends upwardly over and past the outer curved surface of the ring 16, and is folded over on top of the ring 16 to provide a rim 20. An anode terminal post 22 of steel is fast with the floor of the rim 20 and a steel cathode terminal post 24 is fast with the closure 18.

A tubular cathode structure 26 is shown in the annular space between the current collector 20 and the inner surface of the tube 14. In the example shown this cathode structure is a porous iron matrix which is impregnated by liquid stoichiometrically exact $NaAlCl_4$ molten salt electrolyte, the matrix containing particulate solid $NaCl$ dispersed therein, and, in its charged state, containing $FeCl_2$ dispersed therein. (Instead, if desired, a sulphur/sodium polysulphide cathode 26 can be employed). The anode compartment, between the tube 14 and casing 12 is filled to a low level with molten sodium anode material 28, and a gas space 30 under vacuum existing above the level of the sodium 28.

The outer surface 32 of the tube 14 is tightly wrapped with a steel or nickel gauze mesh screen 34, which acts as a wick for wicking molten sodium anode material over as much as possible of said surface 32. This wicking takes place, above the level of the sodium 28, by capillary action against gravity. Said outer surface 32 is doped initially e.g. with ferric oxide according to the method of the present invention, which ferric oxide is reduced to iron either on contact with molten sodium in the cell (see Example 1 hereunder) of separately, prior to loading into the cell (see Example 2 hereunder). This doping substantially improves the wettability of the surface 32, facilitating the wicking by the screen 34, in spite of changes in level of the sodium caused by normal change/discharge cycling of the cell.

EXAMPLE 1

Beta"-alumina tube separators for high temperature electrochemical cells were prepared in accordance with the method of the present invention by dipping them in a 15% by mass solution of ferric chloride in anhydrous ethanol, allowing excess solution to drain and then immediately introducing them into heated air at 40° C. to evaporate the alcohol solvent and to leave a layer of ferric chloride sorbed thereon. As soon as they were dry, i.e. after a few seconds or minutes, they were introduced into heated air at 200° C. and kept there for 30 minutes, to hydrolyse the ferric chloride to ferric hydroxide, and to convert this hydroxide to ferric oxide.

Immersion tests were then conducted on these tubes in molten sodium at 250° C., on control tubes which were untreated, and on control tubes whose surfaces had been treated with lead acetate in the usual way to improve their wettability. The tubes prepared in accordance with the invention were found to be easily wetted with molten sodium, which easily formed a continuous layer thereon, whereas the control tubes could not be wetted with molten sodium at this low temperature. The ferric oxide was reduced to iron by contact with the molten sodium, but the iron remained doped on the tubes which retained their enhanced wettability.

EXAMPLE 2

Example 1 was repeated except that, after the heating in air at 200° C. for 30 minutes, the tubes were introduced into a hydrogen furnace to reduce the sorbed ferric oxide surface layer (which gave a reddish colour to the tubes) to sorbed metallic iron. These tubes were found to be as easily wettable in molten sodium at 250° C. as those according to the invention of Example 1.

Further tests were conducted in which measurements of the effectiveness of dopants were made using experimental cells operating in the temperature range of 175°–420° C.

These cells were somewhat different from that shown in the drawing and each comprised an outer sodium electrode which was pressurised and enclosed by an outer mild steel housing, a beta-alumina tube sealingly glassed to an alpha-alumina insulating coller and a central aluminum post, inside the beta-alumina tube. The arrangement at the insulating collar insulated the central post electronically from the outer cell housing. The inside of the beta-alumina tube was electrolytically filled with sodium to a standard height. From the dimensions of the beta-alumina tube, the height of the sodium in the tube and the resistivity of the beta-alumina, the theoretical resistance of the beta-alumina tube can be calculated. The actual resistance of the cell can be determined experimentally by passing a known current through the cell and measuring the voltage drop across the cell. The resistances of the cell metal components are also known so that the resistance of the cell less the resistance of the metal components yields a value for the beta-alumina tube resistance under test. If the tube is perfectly wetted by the liquid sodium then the calculated and measured values for tube resistance should be the same.

The ratio of the calculated resistance to the experimental value of resistance shows the effectiveness of the coating, ie the lower the measured resistance the better the surface has become wetted by the sodium.

The beta-alumina tubes were substantially the same and were made from a starting material comprising 70% by mass boehmite and 30% by mass alpha-alumina, to which were added soda and lithia dopants, so that the soda formed 9.1% by mass of the doped material and the lithia formed 0.7% by mass thereof. This material was formed into a slurry with water, spray dried, isostatically pressed into tubes and fired to obtain unitary beta-alumina tubes.

EXAMPLE 3

Two sodium/sodium cells as described above were assembled with no doping of the beta-alumina tubes to act as controls.

Four sodium/sodium cells were assembled with their beta-alumina tubes doped with manganese oxide.

An aqueous solution of manganous nitrate of strength 50% by mass was applied by brush to the outside of each tube and then to the inside of each tube by pouring the solution into the tube and then emptying it. The tubes were then placed in an oven at approximately 180° C. to decompose the nitrate to the oxides of manganese.

Resistances of the Na/Na cells were determined at 262° C.

| Dopant | Average Measured Resistance (mOhms) | Average Calculated Resistance (mOhms) | Ratio of calculated to measured resistance |
| --- | --- | --- | --- |
| Controls (None) | 17 | 9 | 0,53 |
| Oxides of Manganese | 10 | 9 | 0,90 |

Clearly the resistance of the Na/Na cells was lower for the doped tubes. This example showed that the doping improved the wetting of the beta-alumina by the melted sodium as demonstrated by an increase of value of said ratio by a factor of nearly 2, thus showing the effect of the doping by a transition metal oxide which forms a mixed oxide with sodium oxide in contact with the molten sodium. Said good wetting occurs at a relatively low temperature of 262° C.

EXAMPLE 4

Four further said sodium/sodium test cells were assembled to test beta-alumina tubes doped with oxides of iron.

A 15% by mass solution of ferric chloride in anhydrous ethanol was applied to the tubes either by brushing and by dipping. The tubes were then heated in air at 40° C. to evaporate the alcohol solvent and to leave a layer of ferric chloride sorbed thereon. When dry, the tubes were heated in air to 200° C. and kept for 30 minutes at this temperature to hydrolyse the ferric chloride to ferric hydroxide and to convert this hydroxide to ferric oxide.

Two further cells were assembled as controls with no doping of the beta-alumina tubes. The resistance measurements of the various sodium/sodium cells were determined at 262° C.

| Dopant | Average Measured Resistance (mOhms) | Average Calculated Resistance (mOhms) | Ratio of calculated to measured resistance |
| --- | --- | --- | --- |
| Controls | 17 | 9 | 0,53 |
| (None) Oxides of iron | 11 | 9 | 0,82 |

In this example doping with a transition metal oxide which is reduced to the metal when in contact with sodium has improved the wettability of the beta-alumina as demonstrated by an increase in said ratio of approximately 30% at 260° C. No material difference was noted whether the doping was by brushing or by dipping.

EXAMPLE 5

Two further said sodium/sodium test cells were assembled to test tubes chromium oxide.

The tubes were doped by making up a saturated aqueous solution of sodium dichromate and painting said solution on the tubes followed by drying at 120° C. in air.

Resistance measurements of the cells were made at 274° C.

| Dopant | Average Measured Resistance (mOhms) | Average Calculated Resistance (mOhms) | Ratio of calculated to measured resistance |
| --- | --- | --- | --- |
| Controls (none) | 15.5 | 9.5 | 0,61 |
| Oxides of Chromium | 10.0 | 9.5 | 0,88 |

In this example doping with a mixed sodium/chromium oxide was also shown to lower the resistance of the sodium/sodium cells at a relatively low temperature of 274° C., by improving the wetting of the beta-alumina tubes by the sodium.

EXAMPLE 6

Two further said sodium/sodium test cells were assembled to test doping of the beta-alumina tubes. A saturated aqueous solution of sodium molybdate ($NaMoO_4$) was applied to the tubes by brushing.

Resistance meansurements of these cells were compared with cells with tubes that had no doping.

| Dopant | Average Measured Resistance (mOhms) | Average Calculated Resistance (mOhms) | Ratio of calculated to measured resistance |
| --- | --- | --- | --- |
| Control (none) | 15.5 | 9.3 | 0,60 |
| Molybdenum Oxide | 11.1 | 9.3 | 0,84 |

Using a mixed sodium/molybdenum oxide was shown to lower the resistance of the cells and improve the wetting by the sodium by 24%.

EXAMPLE 7

Two further said sodium/sodium test cells were assembled with tubes doped with copper oxides and chromium oxides. A mixture of equal amounts of a 25% by mass aqueous solution of chromium VI oxide and a 50% by mass aqueous solution of copper nitrate was prepared. The resultant solution was painted on the outside of the tubes and the insides of the tubes were coated by pouring the solution into the tubes and them emptying the tubes. The solution was found to adhere to the beta-alumina tubes.

Resistance measurements of these cells were compared with resistance measurements of control cells with no doping, at 280° C.

| Dopant | Average Measured Resistance (mOhms) | Average Calculated Resistance (mOhms) | Ratio of calculated to measured resistance |
|---|---|---|---|
| Control (none) | 14 | 9.1 | 0,65 |
| Copper and chromium Oxides | 11 | 9.1 | 0,83 |

This example demonstrates the use of a dopant which comprises oxides comprising of two transition metals one of which (chromium) is a transition metal which forms a sodium/chromium mixed oxide. Again there is an improvement in the wetting of the beta-alumina by the sodium.

It is contemplated that the present invention will have particular utility in the construction of high temperature secondary electrochemical cells of the type wherein a molten sodium anode is separated by a beta"-alumina separator from a sodium aluminium chloride molten salt electrolyte in which a porous cathode structure comprising ferrous chloride as active cathode material is immersed. Such cells typically have an operating temperature of about 250° C. and higher temperatures of 350°–400° C. can damage their cathode structures. The invention can also be applied to sodium sulphur cells with beta"-alumina separators, but as such cells have operating temperatures which are higher than 250° C., wetting is less of a problem.

In particular, the invention has a number of advantages over the use of lead acetate solutions, which are typically painted on to beta"-alumina surfaces to promote sodium wetting. Lead acetate painted tubes are typically heated to 350°–400° C. to decompose the lead acetate to lead, which lead at those temperatures promotes wetting by molten sodium. However, if the temperature is dropped to 250° C., dewetting of lead acetate-treated tubes can take place, possibly as a result of dissolution of lead in the sodium at the higher temperatures of 350°–400° C.; and, as mentioned above, temperatures of 350°–400° C. can adversely affect cathodes of the ferrous chloride type mentioned above.

In fact cells of the above type constructed with tubes prepared according to Examples 1 and 2 above worked well, with no increase in internal resistance on cell cycling which could be attributed to incomplete wetting of the tubes by the molten sodium anodes. In contrast, similar cells having untreated tubes showed an internal resistance rise on cycling attributable to dewetting, which could only be reversed by heating these control cells to 400° C., which adversely affected their cathode capacities. The good wetting for cells according to the invention was found to apply even for inside-anode type cells where the sodium was in contact with very smooth beta"-alumina surfaces on the insides of the tubes, formed by pressing the tubes during fabrication thereof on to smooth stainless steel mandrels. These surfaces are normally very difficult to wet with sodium, because of their smoothness.

We claim:

1. A method of preparing a surface of a ceramic solid electrolyte conductor of alkali metal ions for wetting, in molten form, by the alkali metal whose ions are conducted by the ceramic, which method comprises doping the ceramic surface with an oxide of a transition metal.

2. A method as claimed in claim 1, in which the solid electrolyte is a member of the group comprising beta-alumina and nasicon ceramic solid electrolyte conductors of sodium ions, the doping being by means of an oxide of a single transition metal selected from the group comprising iron, nickel, copper, manganese, cobalt, chromium and molybdenum.

3. A method as claimed in claim 1, which comprises wetting the surface with a film of a solution in a liquid solvent of a salt of the transition metal, evaporating the solvent from the surface to dry the surface and to leave a deposit of the salt on the surface, and converting the deposited salt to the oxide of the transition metal.

4. A method as claimed in claim 3, in which the solution is a solution of the salt in a solvent which is selected from the group comprising water, methanol, ethanol and n-propanol.

5. A method as claimed in claim 3, in which converting the deposited salt to the oxide comprises heating the dried ceramic to an elevated temperature.

6. A method as claimed in claim 5, in which the heating takes place in an oxygen-containing oxidizing atmosphere.

7. A method as claimed in claim 3, in which the salt is a compound of the transition metal with an anion selected from the group comprising halide and nitrate anions.

8. A method as claimed in claim 1, which comprises wetting the surface with a film of a suspension in a liquid of the transition metal oxide, evaporating the liquid of the suspension to dry the surface and leave a deposit of the oxide on the surface, and heating the dried surface to cause the oxide to dope the surface.

9. A method as claimed in claim 8, in which the transition metal oxide forms part of a mixed oxide, being mixed with an oxide of the alkali metal whose ions are conducted by the ceramic.

10. A method as claimed in claim 8, in which the liquid of the suspension is selected from the group comprising methanol, ethanol, n-propanol and mixtures thereof, and is anhydrous.

11. A ceramic solid electrolyte conductor of alkali metal ions which has a surface which has been prepared for wetting by the method of claim 1.

12. A high temperature electrochemical power storage cell having a molten alkali metal anode, a cathode, and between the anode and the cathode and separating them from each other, a separator which is a ceramic solid electrolyte conductor of ions of the alkali metal of the anode, the separator having a surface in contact with the molten alkali metal of the anode which has been prepared for wetting by the alkali metal of the anode, by a method as claimed in claim 1.

* * * * *